US012595039B2

(12) United States Patent
D'Alascio et al.

(10) Patent No.: US 12,595,039 B2
(45) Date of Patent: Apr. 7, 2026

(54) AIR DIRECTING ARRANGEMENT FOR CONTROLLING AIRFLOW AT AN OUTLET

(71) Applicant: AIRBUS HELICOPTERS DEUTSCHLAND GMBH, Donauwörth (DE)

(72) Inventors: Alessandro D'Alascio, Munich (DE); Thomas Kneisch, Gernsbach (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 2 days.

(21) Appl. No.: 18/744,822

(22) Filed: Jun. 17, 2024

(65) Prior Publication Data

US 2025/0136263 A1     May 1, 2025

(30) Foreign Application Priority Data

Oct. 26, 2023     (EP) ..................................... 23205987

(51) Int. Cl.
B64C 1/00          (2006.01)
B64C 1/06          (2006.01)
(52) U.S. Cl.
CPC ............ B64C 1/0009 (2013.01); B64C 1/068 (2013.01)
(58) Field of Classification Search
CPC ......... B64C 1/0009; B64C 1/068; B64C 7/00; B64C 27/04; Y02T 50/10; B64D 13/00;
(Continued)

(56) References Cited

U.S. PATENT DOCUMENTS 2,362,552 A     11/1944     Heymann
6,050,527 A      4/2000     Hebert et al.
(Continued)

FOREIGN PATENT DOCUMENTS

CN     202624638 U     12/2012
RU        203671 U1      4/2021

OTHER PUBLICATIONS

European Search Report for European Application No. EP 23205987. 3, Completed by the European Patent Office, Dated Mar. 6, 2024, 8 pages.

(Continued)

*Primary Examiner* — Valentina Xavier
(74) *Attorney, Agent, or Firm* — BROOKS KUSHMAN P.C.

(57)     ABSTRACT

An air directing arrangement for controlling flow of air at a compartment outlet of a fuselage of a rotorcraft. The air directing arrangement comprises a continuous surface that covers the compartment outlet outside the fuselage and forms a flow channel for directing an air flow at the compartment outlet; a first flow-through opening that is formed at a first position of the flow channel, wherein the first flow-through opening forms an air inlet area; and a second flow-through opening that is formed at a second position of the flow channel, wherein the second flow-through opening is arranged downstream of the first flow-through opening in the predetermined flow direction, and wherein the second flow-through opening forms an air outlet area; wherein the air inlet area is smaller than the air outlet area.

20 Claims, 7 Drawing Sheets

(58) Field of Classification Search
    CPC . B64D 33/08; B64D 13/06; B64D 2013/0614
    See application file for complete search history.

(56)                    References Cited

U.S. PATENT DOCUMENTS

|  | | | |
|---|---|---|---|
| 9,051,057 B2 | 6/2015 | Da Silva et al. | |
| 2012/0273609 A1 | 11/2012 | Prat et al. | |
| 2015/0167552 A1* | 6/2015 | Prouteau ............... | B64D 13/00 |
| | | | 137/15.1 |
| 2016/0153363 A1 | 6/2016 | Zysman et al. | |
| 2020/0023985 A1* | 1/2020 | Scimone ............... | B64D 33/02 |
| 2021/0394917 A1 | 12/2021 | Klovdahl et al. | |
| 2023/0080020 A1* | 3/2023 | Alonso-Miralles .... | B64D 33/02 |
| | | | 244/53 B |

OTHER PUBLICATIONS

Communication Pursuant to Article 94(3) EPC for European Application No. EP 23205987.3, completed by the European Patent Office, dated Dec. 22, 2025, 5 pages.

* cited by examiner

A - A

AIR DIRECTING ARRANGEMENT FOR CONTROLLING AIRFLOW AT AN OUTLET

CROSS-REFERENCE TO RELATED APPLICATIONS

This application claims priority to European patent application No. EP 23205987.3 filed on Oct. 26, 2023, the disclosure of which is incorporated in its entirety by reference herein.

TECHNICAL FIELD

The disclosure is related to an air directing arrangement for controlling flow of air in a predetermined flow direction at a compartment outlet of a fuselage of a rotorcraft. The present disclosure is further related to a rotorcraft having such an air directing arrangement.

BACKGROUND

In general, multiple air inlets and outlets are foreseen on the fuselage of a rotorcraft. Such air inlets and outlets are often used to feed oil coolers on the cowling, air conditioning systems, avionic bays cooling or simply assure ventilation into the cabin. Usually, an inlet is placed at flow stagnation regions and an outlet in under pressure areas on the rotorcraft. Thereby, the air is forced into inlets and sucked out of outlets during cruise flight without implementing any fan, and thus without any additional energy consumption.

Most of the outlets implemented on rotorcraft are of two kinds. The first kind of outlets is made of simple metal sheet, which is cut and bent to form a grille. The grille usually ensures a certain flow direction at the outlet section, which is often between 30° and 50° compared to the fuselage outside surface. The second kind of outlets implement a backward directed scoop on the outlet section, which can assure a flow direction almost tangential to the fuselage around the outlets. The first kind of outlets is often lighter, easy, and cost-efficient to manufacture and to be implemented-even retrofitted-on a fuselage surface, but can more easily trigger air flow separation by destabilizing the air flow on the surface. The second kind of outlets is usually slightly heavier and more difficult to mount on the fuselage than the first kind of outlets, but can better align the outlet air flow to the fuselage surface.

For example, the document RU 203 671 U1 describes an exhaust device enclosure with air intake devices to reduce the exhaust gasses temperature.

Similar air intake structures are described in documents CN 202 624 638 U and U.S. Pat. No. 2,362,552 A. A boundary layer suction system is described in document US 2012/0273609 A1.

The described prior art solutions for air inlets and outlets typically cause local air flow separations that often occur when outlets are located in under pressure regions, short before pressure recovery starts. These local air flow separations can trigger larger air flow separations, usually of unsteady nature, which, interacting with lifting surfaces, might lead to strong vibrations. In the best case these aerodynamic excitations can jeopardize comfort, whereas in the worst, can endanger the structure integrity because of fatigue.

Furthermore, none of the prior art documents describe an air directing arrangement at a compartment outlet that avoids or at least reduces air flow separation that might occur downstream of the outlet section.

SUMMARY

It is, therefore, an object of the present disclosure to provide a new air directing arrangement for controlling flow of air in a predetermined flow direction at a compartment outlet of a fuselage of a rotorcraft for reducing flow separation. This object is solved by an air directing arrangement.

More specifically, according to the present disclosure such an air directing arrangement is provided for controlling flow of air in a predetermined flow direction at a compartment outlet of a fuselage of a rotorcraft. The air directing arrangement comprises a continuous surface, a first flow-through opening, and a second flow-through opening. The continuous surface is provided with a longitudinal direction and covers the compartment outlet outside the fuselage. The continuous surface forms a flow channel for directing an air flow at the compartment outlet. The first flow-through opening is formed at a first position of the flow channel between the continuous surface and the fuselage. The first flow-through opening forms an air inlet area. The second flow-through opening is formed at a second position of the flow channel between the continuous surface and the fuselage. More specifically, the second flow-through opening is arranged downstream of the first flow-through opening in the predetermined flow direction. The second flow-through opening forms an air outlet area, wherein the air inlet area is smaller than the air outlet area.

Advantageously, the inventive air directing arrangement relates to a dynamic scoop, covering the outlet section, featuring in forward flight conditions an upstream inlet and a downstream outlet. The upstream inlet features a rounded lip at the scoop leading edge to avoid local flow detachment, when the flow stream is not properly aligned along the scoop longitudinal direction. More specifically, in forward flight conditions, the air flowing along the solid surfaces enters the scoop through the inlet, and pushes flow from the internal compartment to the outlet. In hover conditions, both the inlet and outlet of the scoop are acting as flow outlets with a larger outflow section area.

The inlet and outlet section areas of the air directing arrangement are dimensioned in such a way that, in the nominal forward flight condition, the mass flow from the internal compartment and the mass flow from the scoop inlet section, adding up in the outlet flow, reach a speed essentially equal to the flow around the scoop outlet region. Moreover, the flow direction will be tangential to the fuselage surface. These characteristics will avoid local flow separation, thereby avoiding larger air flow separations, which, when interacting with lifting surfaces, might lead to strong vibrations. that can jeopardize comfort and/or endanger the structure integrity of the rotorcraft because of fatigue.

Therefore, the present air directing arrangement assures an outflow direction tangential to the surfaces on which it is mounted, and a flow velocity at the outlet section essentially equal to the flow velocity around the scoop itself, so that an air flow detachment at the outlet section will be avoided. Furthermore, the present air directing arrangement can be retrofitted on an existing outlet section by dismounting the outlet grid, for instance, and mounting the new one.

According to some aspects, the continuous surface may comprise a plateau segment and two curved segments. Preferably, the plateau segment is separated from the compartment outlet by a predetermined distance to define respective opening heights of the first flow-through opening and the second flow-through opening. The two curved segments may delimit respective opening widths of the first flow-through opening and the second flow-through opening.

Preferably, the opening height and opening width of the first flow-through opening are respectively smaller than or equal to the opening height and opening width of the second flow-through opening.

According to some aspects, the plateau segment may be formed in the predetermined flow direction with a profile that comprises at the first position an air-foil shaped end section such that the plateau segment is provided with a greater thickness at the first position than at the second position.

Preferably, the greater thickness at the first position reduces the air inlet area compared to the air outlet area.

According to some aspects, the plateau segment may comprise a protrusion at the first position that is arranged opposite to the compartment outlet such that the plateau segment forms a slope section on an inner side opposite to the compartment outlet.

Preferably, in the slope section, a distance between the inner side and the compartment outlet increases from the protrusion towards the second flow-through opening in the predetermined flow direction.

According to some aspects, the plateau segment may comprise a section that extends from the slope section towards the second flow-through opening in parallel to an outer surface of the fuselage.

According to some aspects, the first flow-through opening and the second flow-through opening may be positioned opposite each other along the longitudinal direction of the continuous surface.

Preferably, the two curved segments are positioned at least essentially symmetrically with respect to the longitudinal direction.

In a reference plane perpendicular to the longitudinal direction, a tangential line at any point on either curved segment forms an angle of less than or equal to 90° with an outer side of the plateau segment.

According to some aspects, the air directing arrangement may further comprise a flow splitter. The flow splitter may extend along a longitudinal reference plane, wherein the longitudinal reference plane divides the continuous surface into two symmetrical parts.

According to some aspects, the air directing arrangement may further comprise a wavy structure arranged at the second flow-through opening.

The present disclosure further provides a rotorcraft with an air directing arrangement as described above. The rotorcraft comprises a fuselage, a compartment outlet located on the fuselage, and the air directing arrangement as described above mounted to the fuselage at the compartment outlet.

According to some aspects, the compartment outlet may comprise at least one arcuate compartment outlet edge arranged inside the fuselage to direct the air flow from inside the fuselage through the compartment outlet.

Preferably, in forward flight direction of the rotorcraft, the at least one arcuate compartment outlet edge is formed by a front arcuate apparatus and a rear arcuate apparatus curved in opposed directions.

According to some aspects, the continuous surface of the air directing arrangement may comprise a section that directs an air flow towards the second flow-through opening of the air directing arrangement, and the section is preferably arranged in parallel to an outer surface of the fuselage.

According to some aspects, the first flow-through opening of the air directing arrangement and the second flow-through opening of the air directing arrangement are preferably positioned opposite each other along the longitudinal direction of the continuous surface of the air directing arrangement.

The continuous surface may comprise two curved segments positioned at least essentially symmetrically with respect to the longitudinal direction.

In a reference plane perpendicular to the longitudinal direction, a tangential line at any point on either curved segment preferably forms an angle of greater than or equal to 90° with the outer surface of the fuselage.

According to some aspects, a sum of the air inlet area of the first flow-through opening of the air directing arrangement and the air outlet area of the second flow-through opening of the air directing arrangement is preferably greater than an outlet area of the compartment outlet.

Preferably, the air inlet area of the first flow-through opening of the air directing arrangement, the air outlet area of the second flow-through opening of the air directing arrangement, and the outlet area of the compartment outlet are sized to direct air from an interior of the fuselage through the compartment outlet towards both the air inlet area and the air outlet area during hovering flight of the rotorcraft.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
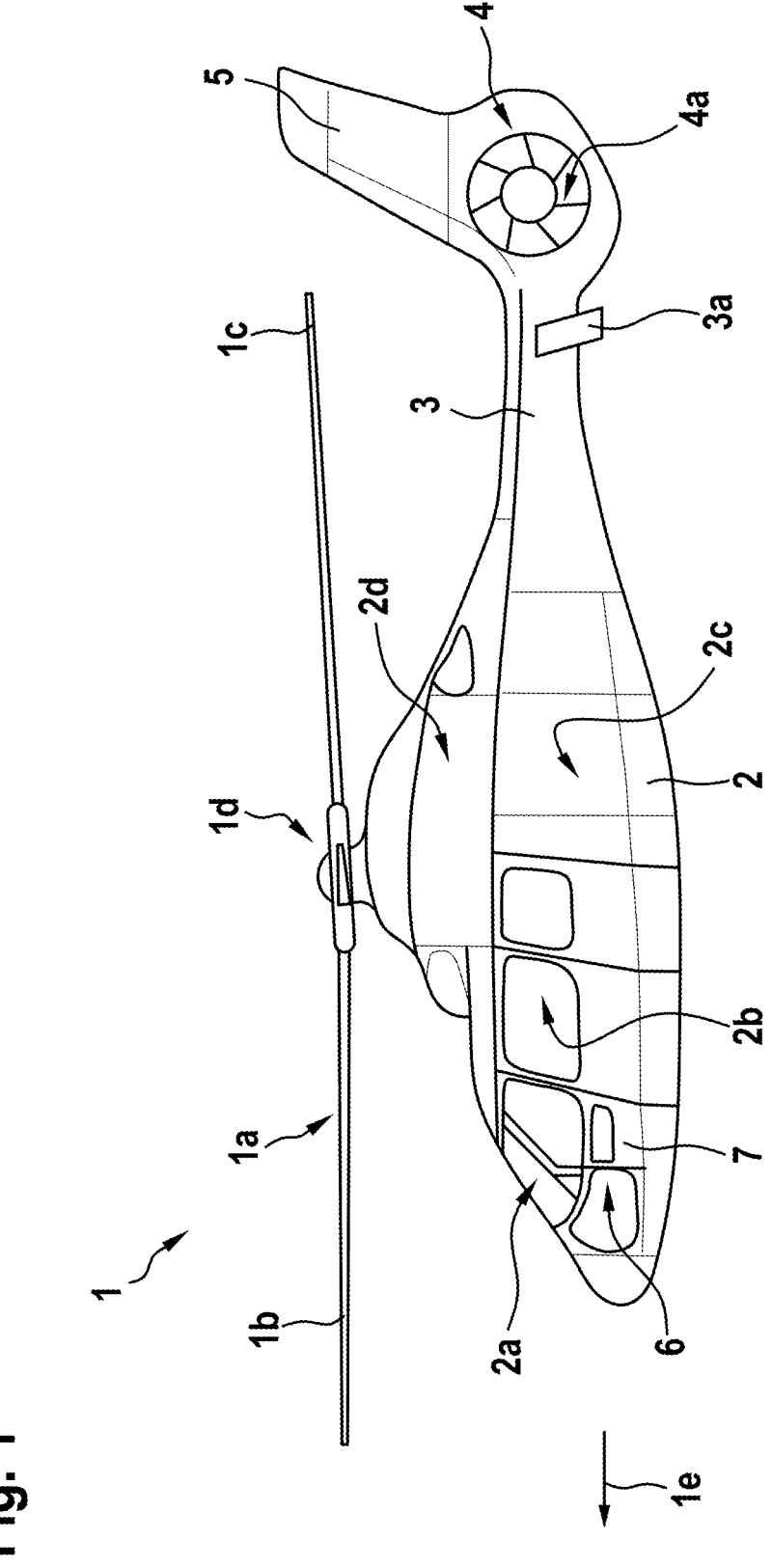
FIG. 1 shows a lateral view of a rotorcraft with an illustrative compartment for receiving an air directing arrangement.

FIG. 1 shows an aircraft that is exemplarily illustrated as a rotorcraft 1 and, more particularly, as a helicopter. Thus, for purposes of simplicity and clarity, the aircraft is hereinafter referred to as the "helicopter 1". The present disclosure is, however, not limited to helicopters and may likewise be applied to any other vehicle.

Illustratively, the helicopter 1 comprises at least one main rotor 1a, preferably a multi-blade main rotor, for providing lift and forward or backward thrust during operation. An arrow 1e illustrates a forward flight direction of the helicopter 1. By way of example, the at least one main rotor 1a comprises a plurality of rotor blades 1b, 1c which are mounted at an associated rotor head 1d to a rotor shaft, which rotates in operation of the helicopter 1 about an associated rotor axis.

Furthermore, the helicopter 1 comprises a fuselage 2 that preferably forms an aircraft interior region 2a, 2b, 2d. Illustratively, a left-hand side of the fuselage 2 is shown and, thus, a port side wall 2c of the fuselage 2 of the helicopter 1.

The aircraft interior region 2a, 2b may accommodate a cockpit 2a and may further accommodate a cabin 2b for passengers and/or cargo. The aircraft interior region 2d may further accommodate a compartment 2d for avionics, if desired. Illustratively, the aircraft interior region 2a, 2b is accessible via a plurality of access doors 6. For instance, the plurality of access doors 6 comprises a cockpit door 7. However, only the cockpit door 7 is separately labelled whereas other doors of the plurality of access doors 6 are not labelled separately, for simplicity and clarity of the drawing.

By way of example, a tail boom 3 with a horizontal stabilizer 3a is connected to the fuselage 2 of the helicopter 1. The helicopter 1 illustratively further comprises at least one preferentially shrouded counter-torque device 4 configured to provide counter-torque during operation, i.e., to counter the torque created by rotation of the at least one main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

Figure 2A:
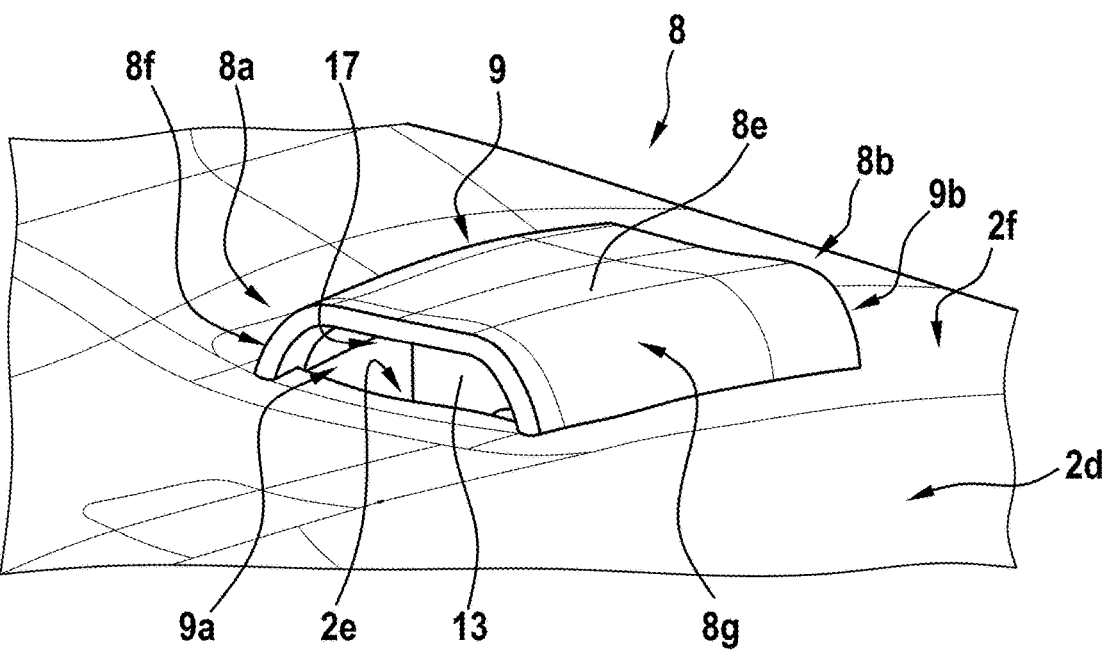
FIG. 2A shows the compartment of FIG. 1 having an illustrative air directing arrangement mounted thereto.

FIG. 2A shows the compartment 2d of the helicopter 1 of FIG. 1 that is provided with an air directing arrangement 8. Illustratively, the air directing arrangement 8 may be installed on top of the compartment 2d.

Illustratively, the air directing arrangement 8 is provided for controlling flow of air in a predetermined flow direction (e.g., flow direction 1i, 1j, 1h of FIGS. 6B and 6C) at a compartment outlet 2e of the fuselage 2 of the helicopter 1 of FIG. 1. The air directing arrangement 8 comprises a continuous surface 9 with a longitudinal direction (e.g., longitudinal direction 8l of FIG. 4A) that covers the compartment outlet 2e outside the fuselage. The continuous surface 9 forms a flow channel (e.g., flow channel 17 in FIG. 2B) for directing an air flow at the compartment outlet 2e.

The air directing arrangement 8 further comprises a first flow-through opening 9a and a second flow-through opening 9b. The first flow-through opening 9a is formed at a first position 8a of the flow channel between the continuous surface 9 and the fuselage. The first flow-through opening 9a forms an air inlet area (e.g., air inlet area 8c of FIG. 6A or 6B). Furthermore, the second flow-through opening 9b is formed at a second position 8b of the flow channel between the continuous surface 9 and the fuselage, wherein the second flow-through opening 9b is arranged downstream of the first flow-through opening 9a in the predetermined flow direction (e.g., flow direction 1i of FIG. 6B or 6C). The second flow-through opening 9b forms an air outlet area (e.g., air outlet area 8d of FIGS. 6A to 6C). More specifically, the air inlet area is smaller than the air outlet area.

Preferably, the flow direction at the second flow-through opening 9b (e.g., flow direction 1i of FIG. 6B or 6C) is essentially parallel to an outer surface 2f of the fuselage. As shown in FIG. 2A, the air directing arrangement 8 may comprise a flow splitter 13 that extends along a longitudinal reference plane (e.g., longitudinal reference plane 8i of FIG. 2B). If desired, the longitudinal reference plane divides the continuous surface 9 into two symmetrical parts. Illustratively, the longitudinal reference plane may divide the continuous surface 9 into two unsymmetrical parts.

In some implementations, the air directing arrangement 8 may lack a flow splitter. In other implementations, the air directing arrangement 8 may include more than one flow splitter 13. For example, the air directing arrangement 8 may include two, three, four, or more flow splitters, each extending along a respective longitudinal reference plane. The respective longitudinal reference planes may be non-parallel to each other. If desired, at least two of the respective longitudinal reference planes may be parallel to each other.

Illustratively, the continuous surface 9 may include a plateau segment 8e and two curved segments 8f, 8g. The plateau segment 8e may be separated from the compartment outlet 2e by a predetermined distance (e.g., distance 8h of FIG. 5B) to define respective opening heights (e.g., opening heights 9c, 9d of FIG. 6A) of the first flow-through opening 9a and the second flow-through opening 9b.

Illustratively, the two curved segments 8f, 8g may delimit respective opening widths (e.g., opening widths 9e, 9f of FIG. 4A) of the first flow-through opening 9a and the second flow-through opening 9b. By way of example, the opening height and opening width of the first flow-through opening 9a are respectively smaller than or equal to the opening height and opening width of the second flow-through opening 9b.

Figure 2B:
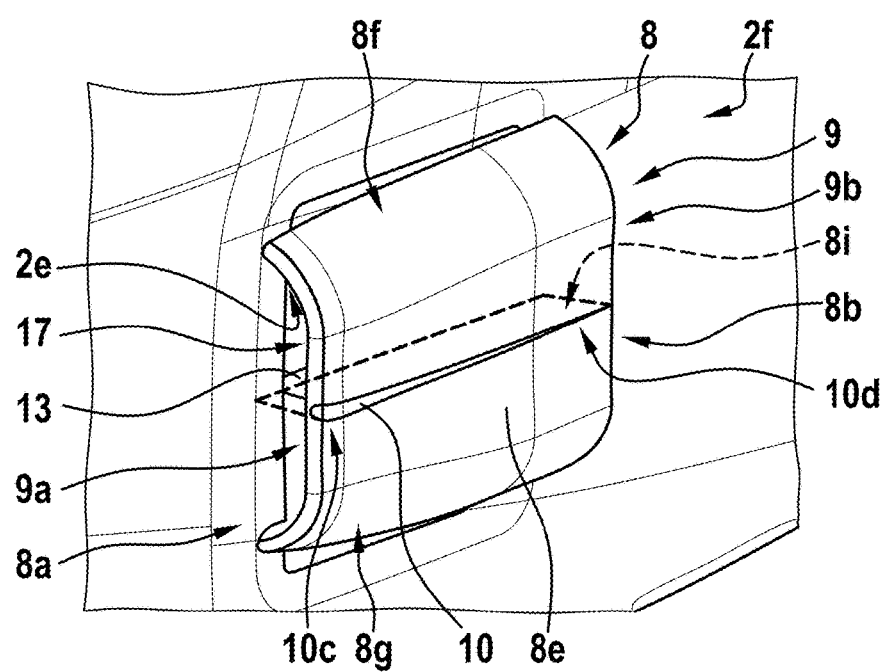
FIG. 2B shows a perspective view of the illustrative air directing arrangement of FIG. 2A mounted to the compartment of FIG. 1.

FIG. 2B shows the illustrative air directing arrangement 8 of FIG. 2A from another perspective. As described above, two curved segments 8f, 8g and the plateau segment 8e of the continuous surface 9 delimit the flow channel 17 between the continuous surface 9 and the fuselage 2.

Illustratively, the flow splitter 13 may extend along a longitudinal reference plane 8i. The longitudinal reference plane 8i divides the continuous surface 9 into two symmetrical parts. By way of example, the longitudinal flow splitter or longitudinal flow strake 13 can be installed inside the air directing arrangement 8 to stabilize the flow inside the flow channel 17.

By way of example, the plateau segment 8e may be formed in the predetermined flow direction (e.g., flow direction 1i of FIG. 6B or 6C) with a profile 10. The profile 10 may comprise at the first position 8a an air-foil shaped end section (e.g., air-foil shaped end section 10*a* of FIGS. 6A to 6C) such that the plateau segment 8*e* is provided with a greater thickness at the first position 8*a* than at the second position 8*b*. Preferably, the greater thickness at the first position 8*a* reduces the air inlet area (e.g., air inlet area 8*c* of FIG. 6A) compared to the air outlet area (e.g., air outlet area 8*d* of FIG. 6A).

By way of example, in the forward flight direction, the first position 8*a* may be located at a front region 10*c* of the profile 10, whereas the second position 8*b* may be located at a rear region 10*d* of the profile 10. If desired, the profile 10 at the front region 10*c* may be formed as a smooth inlet lip to prevent flow separations on the outside and inside of the continuous surface 9 at the air inlet area 8*c*.

Figure 2C:
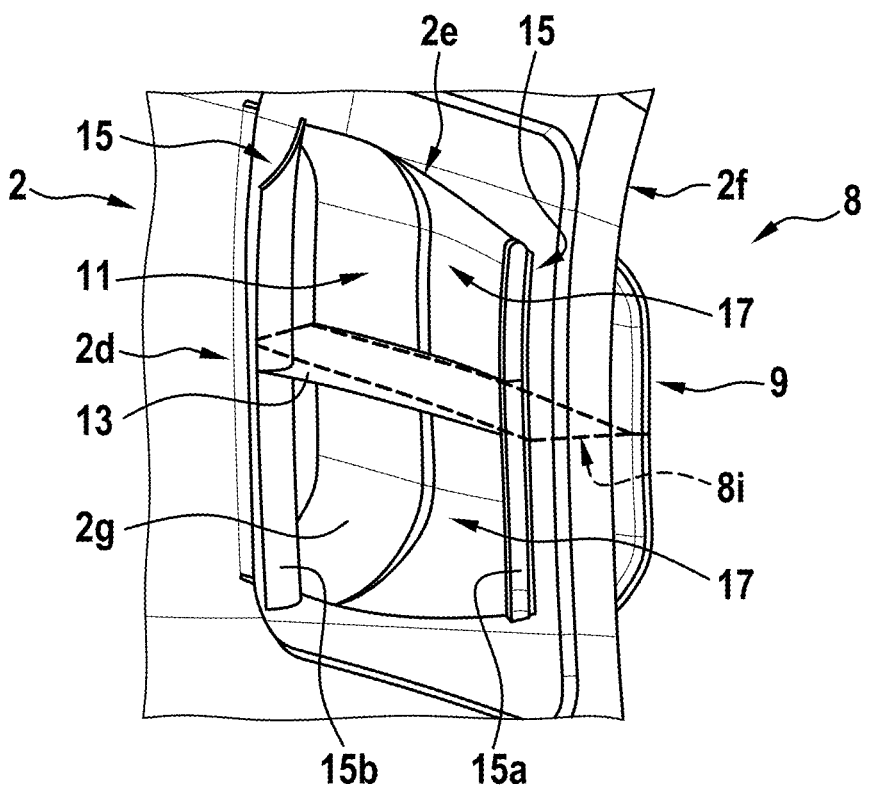
FIG. 2C is a perspective view of the illustrative air directing arrangement of FIG. 2A shown from the inside of the compartment of FIG. 1.

FIG. 2C shows the illustrative air directing arrangement 8 of FIG. 2A from the inside of the compartment 2*d*. In contrast to FIGS. 2A and 2B, FIG. 2C shows an outlet area 2*g* and structures around the outlet area 2*g* of the compartment outlet 2*e*.

Illustratively, the compartment outlet 2*e* may comprise at least one arcuate compartment outlet edge 15. The at least one arcuate compartment outlet edge 15 may be arranged inside the fuselage 2. If desired, the at least one arcuate compartment outlet edge 15 may direct the air flow from inside the fuselage 2 through the compartment outlet 2*e*.

In forward flight direction (e.g., forward flight direction 1*e* of the helicopter 1 of FIG. 1), the at least one arcuate compartment outlet edge 15 may be formed by a front arcuate apparatus 15*a* and a rear arcuate apparatus 15*b* curved in opposed directions. For example, the front and rear arcuate apparatuses 15*a*, 15*b* may be made from metal sheet, plastic sheet, or any other sheet material that is installed at the outlet area 2*g* to prevent flow separations at the compartment outlet 2*e*.

By way of example, the front arcuate apparatus 15*a* may have an overall positive curvature (convex) towards the rear arcuate apparatus 15*b*, whereas the rear arcuate apparatus 15*b* may have an overall positive curvature (convex) towards the front arcuate apparatus 15*a*. If desired, the front arcuate apparatus 15*a* may be smaller than the rear arcuate apparatus 15*b*.

Figure 3:
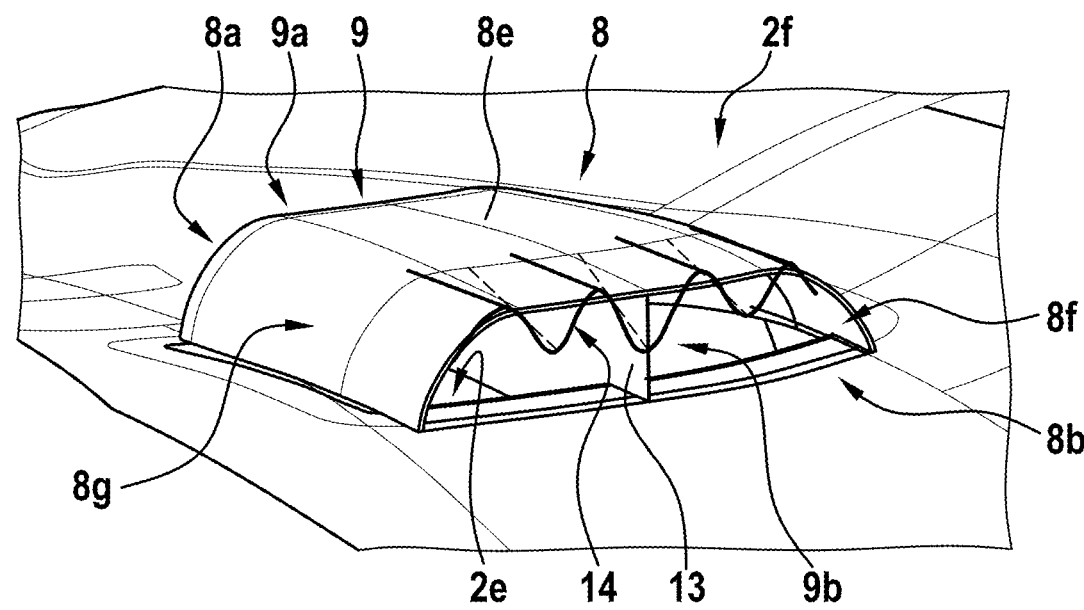
FIG. 3 shows a perspective view of the illustrative air directing arrangement of FIG. 2A with a wavy structure.

FIG. 3 shows the illustrative air directing arrangement 8 of FIG. 2A with a wavy structure at the second flow-through opening 9*b*. As shown in FIG. 3, the air directing arrangement 8 includes the continuous surface 9 which covers the compartment outlet 2*e*. Illustratively, the two curved segments 8*f*, 8*g* and the plateau segment 8*e* of the continuous surface 9 delimit the first flow-through opening 9*a* and the second flow-through opening 9*b*.

Illustratively, the air directing arrangement 8 may comprise a wavy structure 14. The wavy structure 14 may be arranged at the second flow-through opening 9*b*.

Figure 4A:
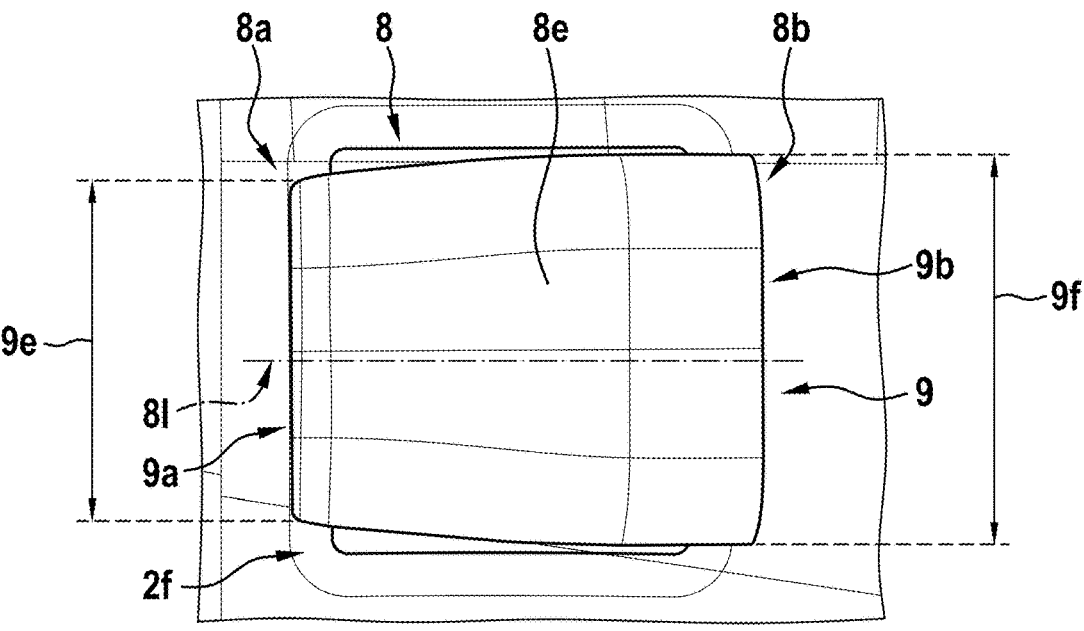
FIG. 4A shows a top view of the illustrative air directing arrangement of FIG. 2A mounted to the compartment of FIG. 1.
Figure 4B:
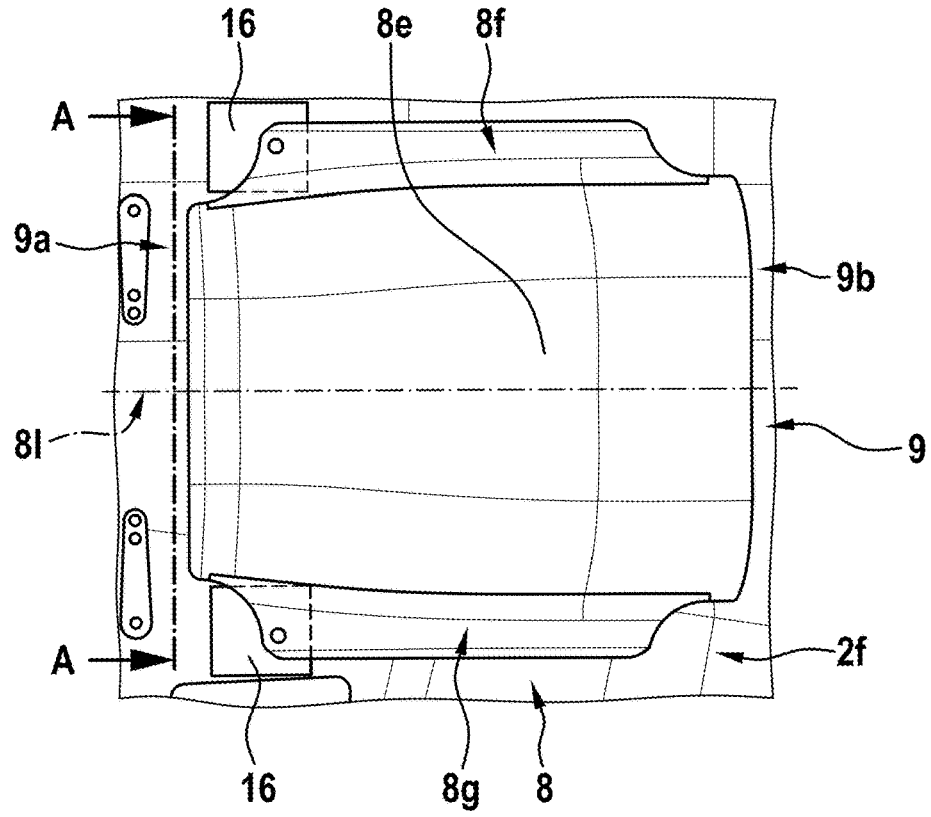
FIG. 4B shows an enlarged detail view of the illustrative air directing arrangement of FIG. 4A.

FIGS. 4A and 4B show a top view of the illustrative air directing arrangement 8 of FIG. 2A that is mounted to the compartment (e.g., compartment 2*d* of FIG. 3). Part of the outer surface 2*f* of the compartment are shown transparently in FIGS. 4A and 4B to illustrate the mounting structure of the air directing arrangement 8.

Illustratively, the air directing arrangement 8 fully covers the compartment outlet (e.g., shown as 2*e* in FIG. 3) of the compartment. Accordingly, the compartment outlet and its outlet area are not shown in the top views of the air directing arrangement 8 of FIGS. 4A and 4B. By way of example, as shown in FIG. 4B, mounting plates 16 may be provided at fasten locations of the air directing arrangement 8 and the outer surface 2*f*.

Illustratively, as shown in FIG. 4A, the opening width 9*e* of the first flow-through opening 9*a* is smaller than the opening width 9*f* of the second flow-through opening 9*b*. If desired, the opening width 9*e* of the first flow-through opening 9*a* may be equal to the opening width 9*f* of the second flow-through opening 9*b*.

Figure 5A:
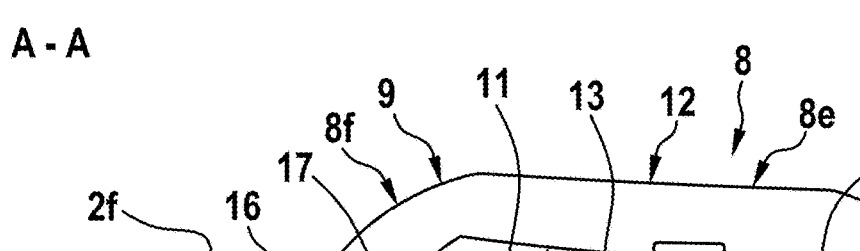
FIG. 5A shows a cross-sectional view of the illustrative air directing arrangement of FIG. 4B mounted to the compartment of FIG. 1, wherein the cross-sectional view is intercepted along A-A of FIG. 4B.

FIG. 5A shows a cross-sectional view of the illustrative air directing arrangement 8 of FIG. 4B. As described above, mounting plates 16 are provided between the air directing arrangement 8 and the outer surface 2*f*, whereas arcuate apparatuses 15*a*, 15*b* are provided inside the compartment 2*d*.

Illustratively, the arcuate apparatuses 15*a*, 15*b* may direct the air flow from inside the compartment 2*d* towards an inner side 11 of the continuous surface 9 along a flow direction 1*g*. If desired, a flow splitter 13 may divide the air flow in the flow channel 17 into two parts.

Figure 5B:
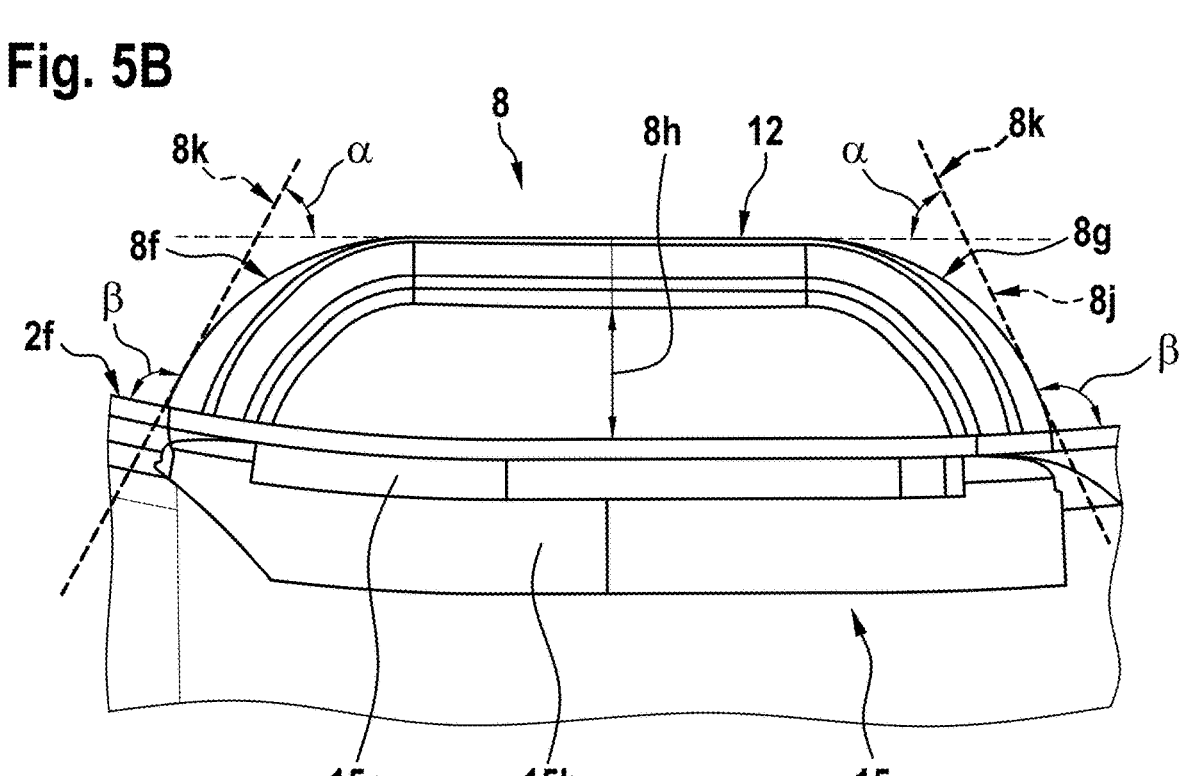
FIG. 5B shows, in forward flight direction, a forward perspective view of the illustrative air directing arrangement mounting to the compartment of FIG. 4B.

FIG. 5B shows a forward perspective view of the illustrative air directing arrangement 8 of FIG. 4B. In contrast to FIG. 5A, the flow splitter (i.e., flow splitter 13 of FIG. 5A) is omitted to illustrate the shape of the continuous surface 9.

Referring to both FIGS. 4B and 5B, the first flow-through opening 9*a* and the second flow-through opening 9*b* may be positioned opposite each other along the longitudinal direction 8*l*. More specifically, the first flow-through opening 9*a* and the second flow-through opening 9*b* may be positioned opposite each other essentially perpendicular to the longitudinal direction 8*l* at different positions along the longitudinal direction 8*l* of the continuous surface 9.

The two curved segments 8*f*, 8*g* may be at least essentially symmetrical with respect to the longitudinal direction 8*l*. Illustratively, in a reference plane 8*j* perpendicular to the longitudinal direction 8*l*, a tangential line 8*k* at any point on either curved segment 8*f*, 8*g* may form an angle α with an outer side 12 of the plateau segment 8*e* that is smaller than or equal to 90°.

As shown in FIG. 5B, the angle between the tangential line 8*k* on curved segment 8*f* and outer side 12 of the plateau segment 8*e* is equal to the angle between the tangential line 8*k* on curved segment 8*g* and outer side 12 of the plateau segment 8*e*. If desired, the angle between the tangential line 8*k* on curved segment 8*f* and outer side 12 of the plateau segment 8*e* may be different than the angle between the tangential line 8*k* on curved segment 8*g* and outer side 12 of the plateau segment 8*e*, while both are still smaller than or equal to 90°.

When illustrated with reference to the outer surface 2*f* of the fuselage, in the reference plane 8*j* perpendicular to the longitudinal direction 8*l*, the tangential line 8*k* at any point on either curved segment 8*f*, 8*g* may form an angle β with the outer surface 2*f* of the fuselage that is greater than or equal to 90°.

It is understood that when the outer surface 2*f* is schematically shown as having a certain degree of curvature, the aforementioned angle β may be formed between a tangential line tangent to the outer surface 2*f* passing through a given point of the outer surface 2*f* and the tangential line 8*k* of curved segment 8*f*, 8*g* passing through that given point.

Figure 6A:
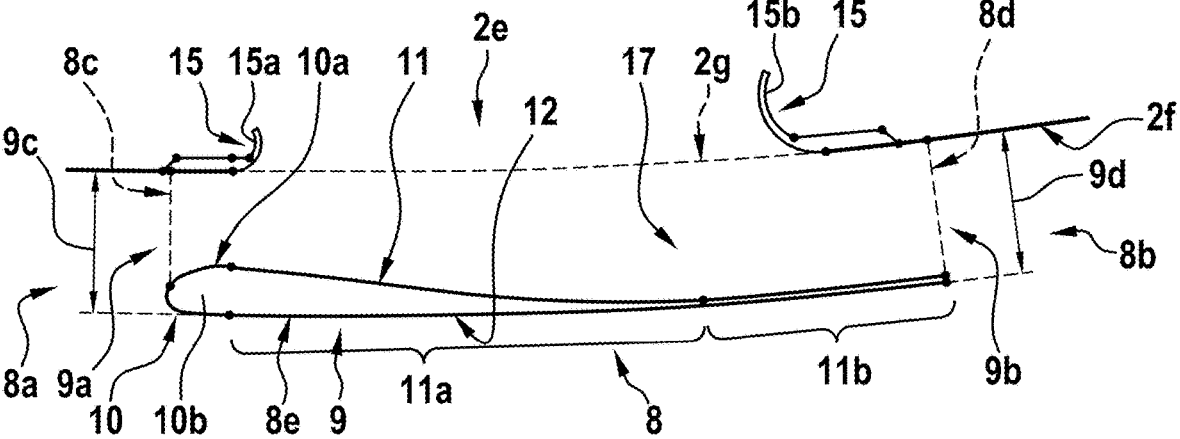
FIG. 6A shows a longitudinal sectional view of a mounting configuration of an illustrative air directing arrangement relative to a compartment outlet.

FIG. 6A is a sectional view along a longitudinal direction (e.g., longitudinal direction 8*l* of FIG. 4B) through an illustrative air directing arrangement 8 that shows the dimensions of the first flow-through opening 9*a*, the second flow-through opening 9*b*, and the outlet area 2*g* of the compartment outlet.

As shown in FIG. 6A, the plateau segment (e.g., plateau segment 8*e* of FIG. 4A) is formed in the predetermined flow direction with a profile that comprises at the first position 8*a* an air-foil shaped end section 10*a* such that the plateau segment is provided with a greater thickness at the first position 8*a* than at the second position 8*b*. The greater thickness at the first position 8*a* reduces the air inlet area 8*c* compared to the air outlet area 8*d* such that the air inlet area 8*c* is smaller than the air outlet area 8*d*.

Illustratively, a sum of the air inlet area 8*c* of the first flow-through opening 9*a* of the air directing arrangement 8 and the air outlet area 8*d* of the second flow-through opening 9*b* of the air directing arrangement 8 may be greater than an outlet area 2*g* of the compartment outlet 2*e*.

Figure 6B:
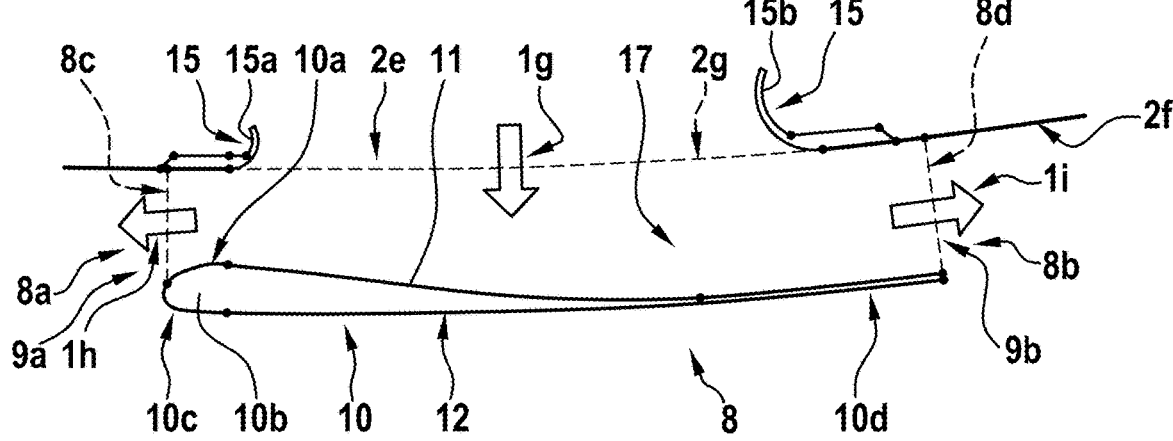
FIG. 6B shows another sectional view of the illustrative air directing arrangement while directing airflow at the compartment outlet of FIG. 6A during hovering operation.
Figure 6C:
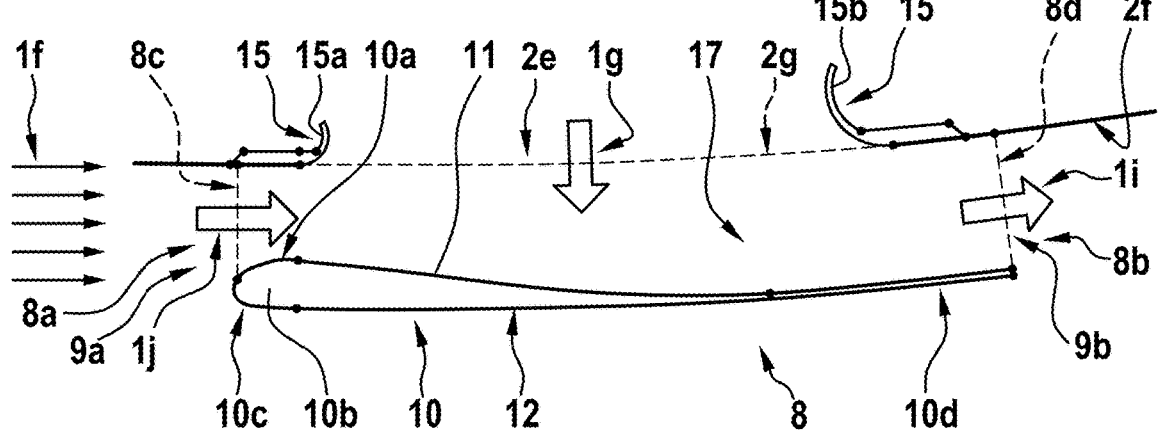
FIG. 6C shows another sectional view of the illustrative air directing arrangement while directing airflow at the compartment outlet of FIG. 6A during forward flight operation.

FIGS. 6B and 6C show the illustrative air directing arrangement 8 of FIG. 6A in different flight conditions.

For example, FIG. 6B shows the illustrative air directing arrangement 8 of FIG. 6A during hovering flight. Illustratively, the air inlet area 8*c* of the first flow-through opening 9*a* of the air directing arrangement 8, the air outlet area 8*d* of the second flow-through opening 9*b* of the air directing arrangement 8, and the outlet area 2*g* of the compartment outlet 2*e* are sized to direct air from an interior of the fuselage 2 through the compartment outlet 2*e* towards both the air inlet area 8*c* and the air outlet area 8*d* during hovering flight.

Thus, during hovering flight, both the first flow-through opening 9*a* and the second flow-through opening 9*b* work as outlets, so that a flow of the air mass from the compartment is solely the result of the compartment over pressure $\Delta P_{COMP}$. Thereby, the air mass enters the air directing arrangement 8 from the interior of the compartment along flow direction 1*g*, and then exits the first flow-through opening 9*a* and the second flow-through opening 9*b* along the flow directions 1*h* and 1*i*, respectively.

The mass conservation law may be applied to determine the relationship between the size of the outlet area 2*g* of the compartment outlet 2*e* and the sizes of the air inlet area 8*c* of the first flow-through opening 9*a* and air outlet area 8*d* of the second flow-through opening 9*b* during hovering flight:

$$\dot{m}_{COMP} = \dot{m}_{INLET} + \dot{m}_{OUTLET}, \tag{1}$$

which at constant air density results in $$A_{COMP} * v_{COMP} = A_{INLET} * v_{INLET} + A_{OUTLET} * v_{OUTLET}, \tag{2}$$

wherein $\dot{m}_{COMP}$ is a mass flow rate from the internal compartment 2*d*, $\dot{m}_{INLET}$ is a mass flow rate at the air inlet area 80, $\dot{m}_{OUTLET}$ is a mass flow rate at the air outlet area 8*d*, and the unit for the mass flow rate is kilogram per second (kg/s). Furthermore, $A_{COMP}$ is a cross-section area of the compartment outlet 2*e*, $A_{INLET}$ is a cross-section area (i.e., air inlet area 8*c*) of the first flow-through opening 9*a*, $A_{OUTLET}$ is a cross-section area (i.e., air outlet area 8*d*) of the second flow-through opening 9*b*, and the unit for the cross-section area is square meter (m²). Accordingly, $v_{COMP}$ is an average flow velocity from the internal compartment 2*d*, $v_{INLET}$ is an average flow velocity at the first flow-through opening 9*a*, $v_{OUTLET}$ is an average flow velocity at the second flow-through opening 9*b*, and the unit for the average flow velocity is meter per second (m/s).

To keep the pressure losses as low as possible the average flow velocity needs to be minimized on sections $A_{INLET}$ and $A_{OUTLET}$. Thus, the following rule:

$$A_{COMP} < A_{INLET} + A_{OUTLET} \tag{3}$$

should be applied in dimensioning the air inlet area 8*c* of the first flow-through opening 9*a* and the air outlet area 8*d* of the second flow-through opening 9*b* during hovering flight.

During forward flight, which is illustratively shown in FIG. 6C, air flows outside the fuselage along a flow direction 1*f* towards the air directing arrangement 8 and enters the air directing arrangement 8 in flow direction 1*j* at the first flow-through opening 9*a*. Air from inside the interior of the compartment flows along the flow direction 1*g* and enters the air directing arrangement 8 via the compartment outlet 2*e*. The air then exits the air directing arrangement 8 along the flow direction 1*i* at the second flow-through opening 9*b*.

The mass conservation law may be applied to determine a relationship between the size of the outlet area 2*g* of the compartment outlet 2*e* and the sizes of the air inlet area 8*c* of the first flow-through opening 9*a*, and air outlet area 8*d* of the second flow-through opening 9*b* during forward flight:

$$\dot{m}_{OUTLET} = \dot{m}_{INLET} + \dot{m}_{COMP}, \tag{4}$$

which at constant air density results in:

$$A_{OUTLET} * v_{OUTLET} = A_{INLET} * v_{INLET} + \dot{m}_{COMP}. \tag{5}$$

The velocity of the air flow at the first flow-through opening 9*a* and the velocity of the air flow at the second flow-through opening 9*b* may be approximated to be equal to the air flow velocity around the portion of the fuselage on which the air directing arrangement 8 is installed, which is a function of the rotorcraft advancing speed $v_{RC}$. Therefore, the outlet area may be approximated as:

$$A_{OUTLET} = A_{INLET} + \dot{m}_{COMP}/(\rho * v_{RC} * Kv), \tag{6}$$

wherein $\rho$ refers to the air density in kilogram per cubic meter (kg/m³), and Kv is a ratio obtained by $v/v_{RC}$, wherein $v$ is the local flow velocity on the fuselage and $v_{RC}$ is the rotorcraft advancing speed in meter per second (m/s).

It is understood that the mass flow from the internal compartment $\dot{m}_{COMP}$ needs to be determined, as well as the Kv parameter, which depends upon the local flow velocity on the fuselage.

By solving equations (3) and (6), an estimation of dimensions of the air directing arrangement 8 can be determined. This estimation can be refined by more detailed aerodynamic simulations.

At this point, it should be noted that methods for performing further calculations and simulations based on the flight condition of the helicopter are well known to those skilled in the art. Therefore, a more detailed description of such methods is omitted, for brevity and conciseness.

Referring back to FIG. 6A, the plateau segment 8*e* of the continuous surface 9 is illustrated with an inner side 11 and an outer side 12. The plateau segment 8*e* in FIG. 6A may be viewed as a cross-sectional view of the plateau segment 8*e* of FIG. 4B along the longitudinal direction 8*l*.

Illustratively, the continuous surface 9 of the air directing arrangement 8 may comprise a section 11*b* that directs an air flow towards the second flow-through opening 9*b* of the air directing arrangement 8. In some implementations, the section 11*b* is parallel to an outer surface 2*f* of the fuselage. By way of example, FIG. 6A shows a dashed line to illustrate an extension of the outer side 12 of the plateau segment 8*e*, which is essentially parallel to the outer surface 2*f* of the fuselage.

By way of example, the plateau segment 8*e* may include a protrusion 10*b* at the first position 8*a*. The protrusion 10*b* may be arranged opposite to the compartment outlet 2*e* such that the plateau segment 8*e* forms a slope section 11*a* on the inner side 11 opposite to the compartment outlet 2*e*.

Illustratively, in the slope section 11*a*, the distance between the inner side 11 and the compartment outlet 2*e* may increase from the protrusion 10*b* towards the second flow-through opening 9*b* in the predetermined flow direction 1*i*.

Figure 7A:
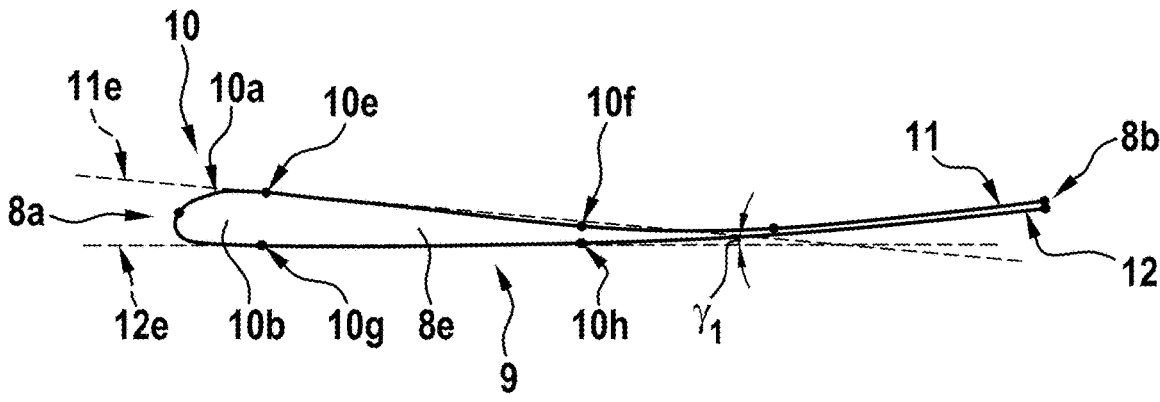
FIG. 7A shows an enlarged view of an illustrative plateau segment of the air directing arrangement, wherein a degree of inclination at one point of an inner side of the plateau segment is illustrated.
Figure 7B:
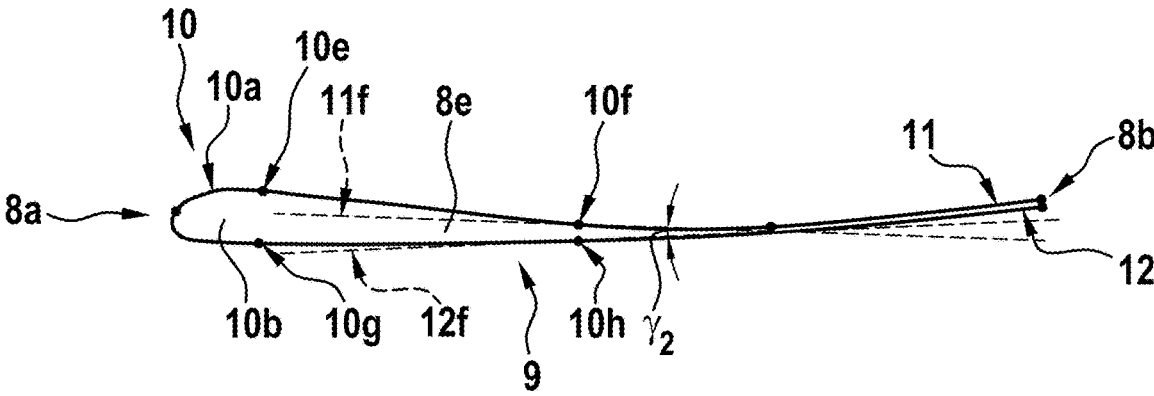
FIG. 7B shows a degree of inclination at another point of the plateau segment of the air directing arrangement of FIG. 7A.

FIGS. 7A and 7B show an enlarged view of the plateau segment 8*e* of the continuous surface 9 of the air directing arrangement. Illustratively, the slope section (e.g., slope section 11*a* of FIG. 6A) of the plateau segment 8*e* may form an angle γ1 of inclination from the protrusion 10*b* at the first position 8*a* towards the second flow-through opening 9*b* at the second position 8*b*.

As shown in FIG. 7A, angle γ1 may be the angle at the intersection between a first tangential line 11*e* and a second tangential line 12*e*. The first tangential line 11*e* may be the tangent to the inner side 11 at a point 10*e* that is close to the protrusion 10*b*. The second tangential line 12*e* may be tangent to the outer side 12 at the point 10*g* close to the protrusion 10*b*. Angle γ1 may illustrate the inclination of the slope section 11*a* at the point 10*e*. As shown in FIG. 7B, angle γ2 may be the angle at the intersection between a third tangential line 11*f* and a fourth tangential line 12*f*. The third tangential line 11*f* may be the tangent to the inner side 11 at a point 10*f*, and the fourth tangential line 12*f* may be the tangent to the outer side 12 at the point 10*h*. Angle γ2 may illustrate the inclination of the slope section 11*a* at the point 10*f*. Illustratively, the angle γ1 is slightly greater than the angle γ2. Accordingly, the inclination of the profile 10 may be gradually flattened from the first position 8*a* to the second position 8*b*.

It should be noted that modifications to the above described embodiments are within the common knowledge of the person skilled in the art and, thus, also considered as being part of the present disclosure. It should further be noted that the drawings are only intended for schematically representing embodiments of the present disclosure and not for showing detailed constructions thereof. For instance, the air directing arrangement 8 is shown and described in FIG. 3 with a wavy structure 14 having three crests. However, the number of crests may also be less or more than three. Furthermore, instead of having a crest divided by the flow splitter 13, the wavy structure 14 may also be formed as having two wave crests on each side of the flow splitter 13. Moreover, the air directing arrangement 8 may also be used without the flow splitter 13.

REFERENCE LIST 1 rotorcraft
1*a* multi-blade main rotor
1*b*, 1*c* rotor blades

12

1*d* rotor head
1*e* forward flight direction
1*f*, 1*g*, 1*h*, 1*i*, 1*j* flow directions
2 fuselage
2*a* cockpit
2*b* cabin
2*c* portside wall
2*d* compartment
2*e* compartment outlet
2*f* outer surface
2*g* outlet area
3 tail boom
3*a* horizontal stabilizer
4 counter-torque device
4*a* tail rotor
5 fin
6 access doors
7 cockpit door
8 air directing arrangement
8*a* first position
8*b* second position
8*c* air inlet area
8*d* air outlet area
8*e* plateau segment
8*f*, 8*g* curved segments
8*h* distance
8*i*, 8*j* reference planes
8*k*, 11*e*, 11*f*, 12*e*, 12*f* tangential lines
8*l* longitudinal direction
9 continuous surface
9*a* first flow-through opening
9*b* second flow-through opening
9*c*, 9*d* opening heights
9*e*, 9*f* opening widths
10 profile
10*a* air-foil shaped end section
10*b* protrusion
10*c* front region
10*d* rear region
10*e*, 10*f*, 10*g*, 10*h* points
11 inner side
11*a* slope section
11*b* flat section
12 outer side
13 flow splitter
14 wavy structure
15 arcuate compartment outlet edge
15*a*, 15*b* arcuate apparatus
16 mounting plate
17 flow channel
α, β, γ1, γ2 angles

The invention claimed is:

1. An air directing arrangement for controlling flow of air in a predetermined flow direction at a compartment outlet of a fuselage of a rotorcraft, comprising:

a continuous surface with a longitudinal direction that covers the compartment outlet outside the fuselage and forms a flow channel for directing an air flow at the compartment outlet, wherein the continuous surface comprises a plateau segment and two curved segments;

a first flow-through opening that is formed at a first position of the flow channel between the continuous surface and the fuselage, wherein the first flow-through opening forms an air inlet area; and a second flow-through opening that is formed at a second position of the flow channel between the continuous surface and the fuselage, wherein the second flow-through opening is arranged downstream of the first flow-through opening in the predetermined flow direction, and wherein the second flow-through opening forms an air outlet area;

wherein the plateau segment is separated from the compartment outlet by a predetermined distance to define respective opening heights of the first flow-through opening and the second flow-through opening, wherein the two curved segments delimit respective opening widths of the first flow-through opening and the second flow-through opening, wherein the opening height and opening width of the first flow-through opening are respectively smaller than or equal to the opening height and opening width of the second flow-through opening; and wherein the air inlet area is smaller than the air outlet area.

2. The air directing arrangement of claim 1, wherein the plateau segment is formed in the predetermined flow direction with a profile that comprises at the first position an air-foil shaped end section such that the plateau segment is provided with a greater thickness at the first position than at the second position; and wherein the greater thickness at the first position reduces the air inlet area compared to the air outlet area.

3. The air directing arrangement of claim 1, wherein the plateau segment comprises a protrusion at the first position that is arranged opposite to the compartment outlet such that the plateau segment forms a slope section on an inner side opposite to the compartment outlet; and wherein, in the slope section, a distance between the inner side and the compartment outlet increases from the protrusion towards the second flow-through opening in the predetermined flow direction.

4. The air directing arrangement of claim 3, wherein the plateau segment comprises a section that extends from the slope section towards the second flow-through opening in parallel to an outer surface of the fuselage.

5. The air directing arrangement of claim 1, wherein the first flow-through opening and the second flow-through opening are positioned opposite each other along the longitudinal direction of the continuous surface, wherein the two curved segments are positioned at least essentially symmetrically with respect to the longitudinal direction, and wherein, in a reference plane perpendicular to the longitudinal direction, a tangential line at any point on either curved segment forms an angle of less than or equal to 90° with an outer side of the plateau segment.

6. The air directing arrangement of claim 1, further comprising a flow splitter which extends along a longitudinal reference plane, wherein the longitudinal reference plane divides the continuous surface into two symmetrical parts.

7. The air directing arrangement of claim 1, further comprising a wavy structure arranged at the second flow-through opening.

8. A rotorcraft comprising a fuselage, a compartment outlet located on the fuselage, and an air directing arrangement that is mounted to the fuselage at the compartment outlet for controlling flow of air in a predetermined flow direction at the compartment outlet, wherein the air directing arrangement comprises:

a continuous surface with a longitudinal direction that covers the compartment outlet outside the fuselage and forms a flow channel for directing an air flow at the compartment outlet, wherein the continuous surface comprises a plateau segment and two curved segments;

a first flow-through opening that is formed at a first position of the flow channel between the continuous surface and the fuselage, wherein the first flow-through opening forms an air inlet area; and a second flow-through opening that is formed at a second position of the flow channel between the continuous surface and the fuselage, wherein the second flow-through opening is arranged downstream of the first flow-through opening in the predetermined flow direction and wherein the second flow-through opening forms an air outlet area;

wherein the plateau segment is separated from the compartment outlet by a predetermined distance to define respective opening heights of the first flow-through opening and the second flow-through opening, wherein the two curved segments delimit respective opening widths of the first flow-through opening and the second flow-through opening, wherein the opening height and opening width of the first flow-through opening are respectively smaller than or equal to the opening height and opening width of the second flow-through opening, and wherein the air inlet area is smaller than the air outlet area.

9. The rotorcraft of claim 8, wherein the compartment outlet comprises at least one arcuate compartment outlet edge arranged inside the fuselage to direct the air flow from inside the fuselage through the compartment outlet.

10. The rotorcraft of claim 9, wherein, in forward flight direction of the rotorcraft, the at least one arcuate compartment outlet edge is formed by a front arcuate apparatus and a rear arcuate apparatus curved in opposed directions.

11. The rotorcraft of claim 8, wherein the continuous surface of the air directing arrangement comprises a section that directs an air flow towards the second flow-through opening of the air directing arrangement, and wherein the section is arranged in parallel to an outer surface of the fuselage.

12. The rotorcraft of claim 11, wherein the first flow-through opening of the air directing arrangement and the second flow-through opening of the air directing arrangement are positioned opposite each other along the longitudinal direction of the continuous surface of the air directing arrangement, wherein the continuous surface comprises two curved segments positioned at least essentially symmetrically with respect to the longitudinal direction, and wherein in a reference plane perpendicular to the longitudinal direction, a tangential line at any point on either curved segment forms an angle of greater than or equal to 90° with the outer surface of the fuselage.

13. The rotorcraft of claim 8, wherein a sum of the air inlet area of the first flow-through opening of the air directing arrangement and the air outlet area of the second flow-through opening of the air directing arrangement is greater than an outlet area of the compartment outlet.

14. The rotorcraft of claim 13, wherein the air inlet area of the first flow-through opening of the air directing arrangement, the air outlet area of the second flow-through opening of the air directing arrangement, and the outlet area of the compartment outlet are sized to direct air from an interior of the fuselage through the compartment outlet towards both the air inlet area and the air outlet area during hovering flight of the rotorcraft.

15. An air directing arrangement for controlling flow of air in a predetermined flow direction at a compartment outlet of a fuselage of a rotorcraft, comprising:

a continuous surface with a longitudinal direction that covers the compartment outlet outside the fuselage and forms a flow channel for directing an air flow at the compartment outlet, wherein the continuous surface comprises a plateau segment and two curved segments, and wherein the continuous surface is formed in the predetermined flow direction with a profile that comprises at a first position an air-foil shaped end section such that the plateau segment is provided with a greater thickness at the first position than at a second position;

a first flow-through opening that is formed at the first position of the flow channel between the continuous surface and the fuselage, wherein the first flow-through opening forms an air inlet area; and a second flow-through opening that is formed at the second position of the flow channel between the continuous surface and the fuselage, wherein the second flow-through opening is arranged downstream of the first flow-through opening in the predetermined flow direction, and wherein the second flow-through opening forms an air outlet area;

wherein the air inlet area is smaller than the air outlet area.

16. The air directing arrangement of claim 15, wherein the plateau segment is separated from the compartment outlet by a predetermined distance to define respective opening heights of the first flow-through opening and the second flow-through opening, wherein the two curved segments delimit respective opening widths of the first flow-through opening and the second flow-through opening, and wherein the opening height and opening width of the first flow-through opening are respectively smaller than or equal to the opening height and opening width of the second flow-through opening.

17. The air directing arrangement of claim 15, wherein the greater thickness at the first position reduces the air inlet area compared to the air outlet area.

18. The air directing arrangement of claim 15, wherein the plateau segment comprises a protrusion at the first position that is arranged opposite to the compartment outlet such that the plateau segment forms a slope section on an inner side opposite to the compartment outlet; and wherein, in the slope section, a distance between the inner side and the compartment outlet increases from the protrusion towards the second flow-through opening in the predetermined flow direction.

19. The air directing arrangement of claim 18, wherein the plateau segment comprises a section that extends from the slope section towards the second flow-through opening in parallel to an outer surface of the fuselage.

20. The air directing arrangement of claim 15, wherein the first flow-through opening and the second flow-through opening are positioned opposite each other along the longitudinal direction of the continuous surface, wherein the two curved segments are positioned at least essentially symmetrically with respect to the longitudinal direction, and wherein, in a reference plane perpendicular to the longitudinal direction, a tangential line at any point on either curved segment forms an angle of less than or equal to 90° with an outer side of the plateau segment.

\* \* \* \* \*